United States Patent
Omata et al.

(10) Patent No.: US 10,187,564 B2
(45) Date of Patent: Jan. 22, 2019

(54) FOCUS ADJUSTMENT APPARATUS, IMAGING APPARATUS, FOCUS ADJUSTMENT METHOD, AND RECORDING MEDIUM STORING A FOCUS ADJUSTMENT PROGRAM THEREON

(71) Applicant: Olympus Corporation, Hachioji-shi, Tokyo (JP)

(72) Inventors: Yoshinobu Omata, Hachioji (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/841,314

(22) Filed: Dec. 14, 2017

(65) Prior Publication Data

US 2018/0176454 A1 Jun. 21, 2018

(30) Foreign Application Priority Data

Dec. 20, 2016 (JP) ................................. 2016-247021

(51) Int. Cl.
  *H04N 5/232* (2006.01)
  *H04N 5/369* (2011.01)
(52) U.S. Cl.
  CPC ............................... *H04N 5/23212* (2013.01)
(58) Field of Classification Search
  CPC .... H04N 5/23212; H04N 5/3696; G02B 7/28; G02B 27/646
  USPC .......................................... 348/345, 354, 357
  See application file for complete search history.

(56) References Cited

U.S. PATENT DOCUMENTS

| | | | | |
|---|---|---|---|---|
| 5,873,006 | A | * 2/1999 | Iwane | ....................... G02B 7/28 396/95 |
| 5,930,532 | A | * 7/1999 | Matsumoto | .......... G02B 27/646 396/104 |
| 2015/0124153 | A1 | * 5/2015 | Hamada | ............. H04N 5/23212 348/349 |
| 2016/0105600 | A1 | * 4/2016 | Omata | ............... H04N 5/23212 348/140 |
| 2017/0208240 | A1 | * 7/2017 | Kadohara | .......... H04N 5/23212 |

FOREIGN PATENT DOCUMENTS

JP  2016-080791  5/2016

* cited by examiner

*Primary Examiner* — Nhan T Tran
(74) *Attorney, Agent, or Firm* — John C. Pokotylo; Pokotylo Patent Services

(57) ABSTRACT

A focus adjustment apparatus includes a circuit. The circuit is configured to determine a defocus value based on an output of an image sensor to calculate a position where the focus lens attains focus as a target position; detect a focal distance of the photographing lens; store the target position, which is calculated based on an output from a detection operation by the image sensor, in association with the focal distance at the time of the detection operation; determine a reference focal distance and calculate a corrected target position by correcting the stored target position so as to correspond to the reference focal distance; calculate a predicted position by performing moving object prediction calculation based on the corrected target position; and move the focus lens based on the predicted position.

16 Claims, 11 Drawing Sheets

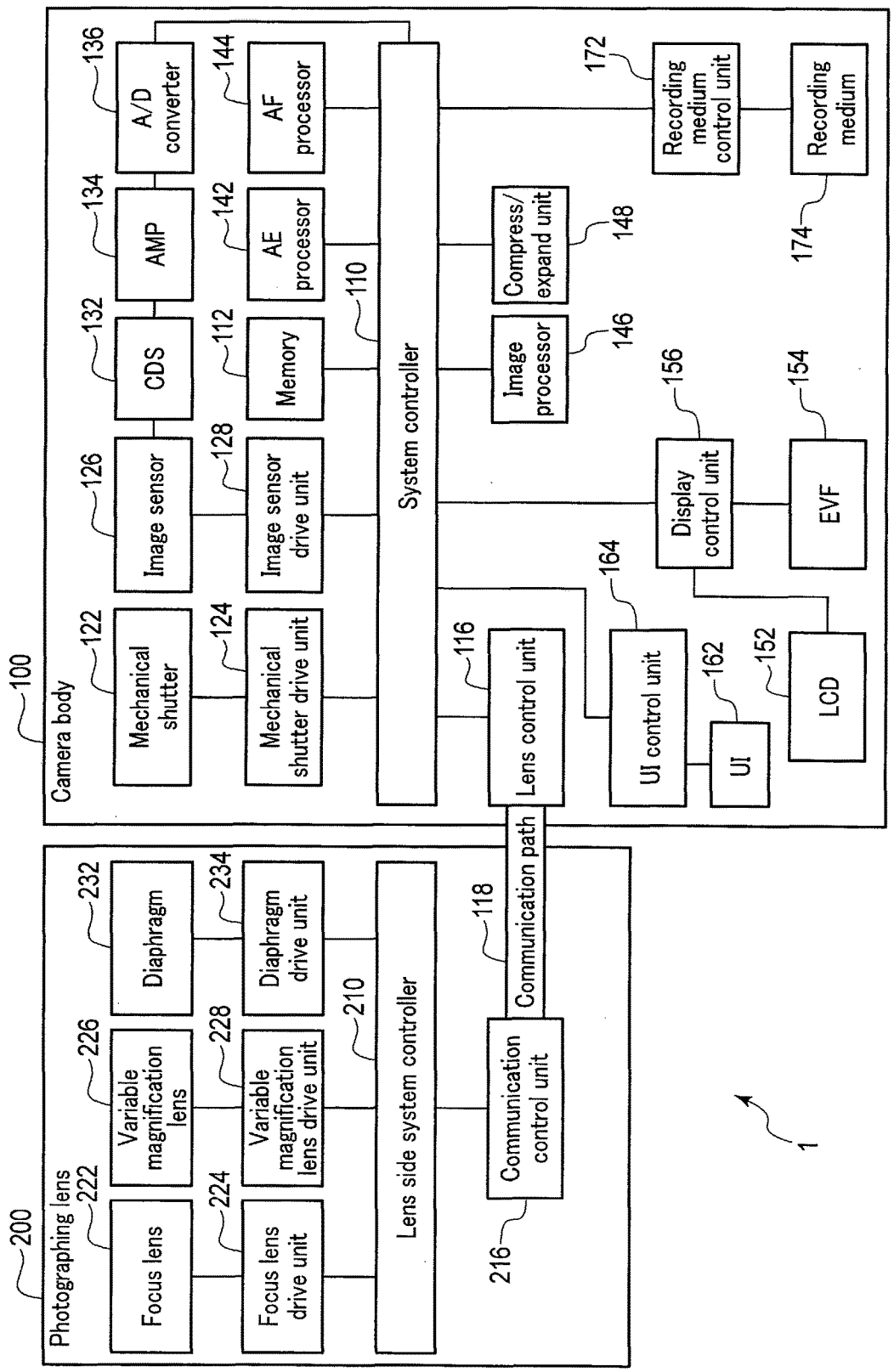
F I G. 1

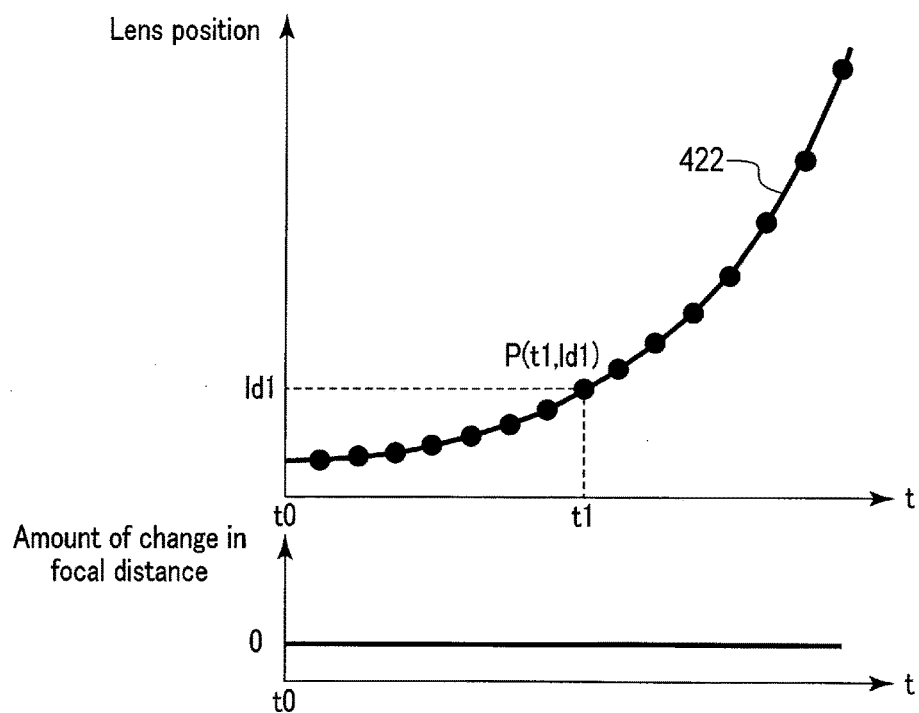
F I G. 3A
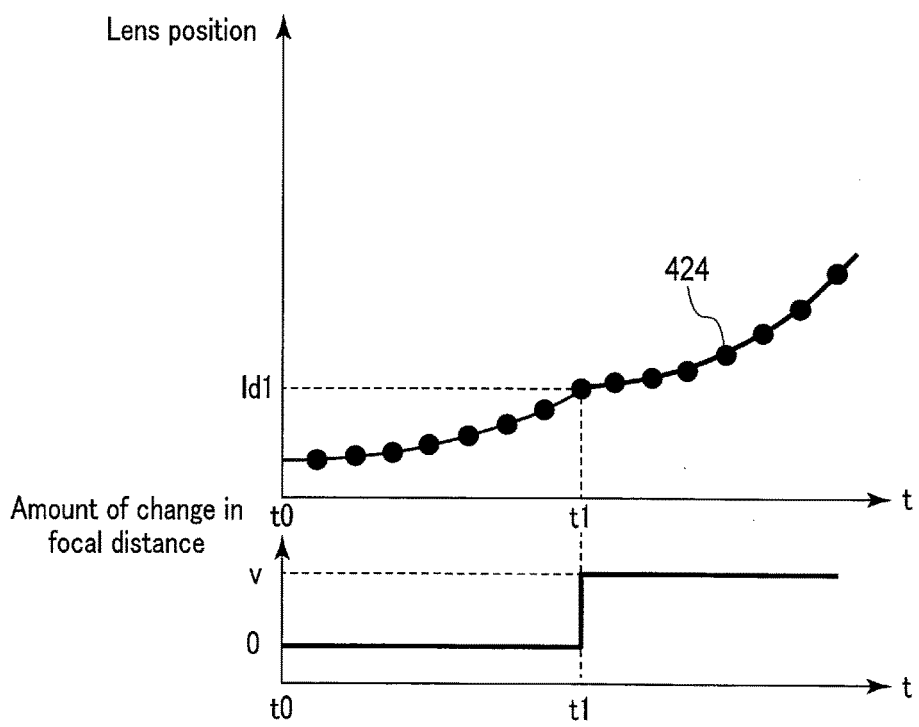
F I G. 3B

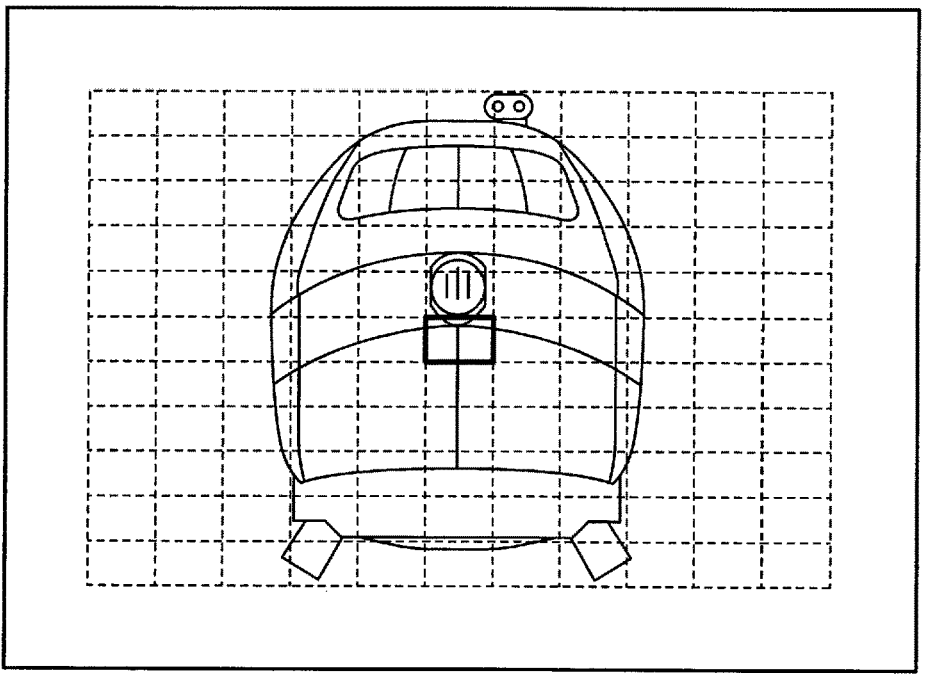
F I G. 5A
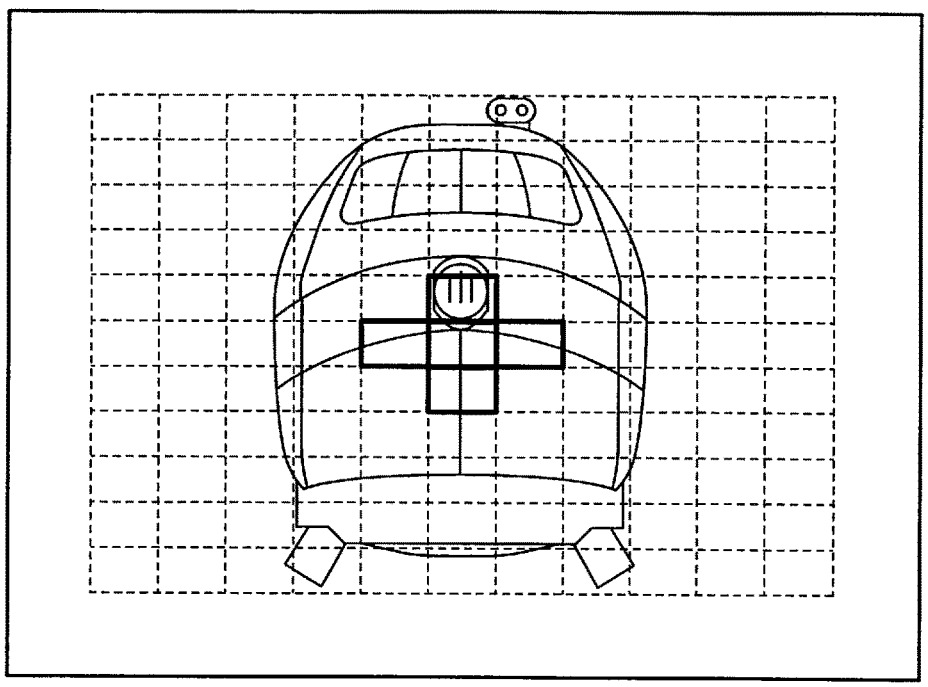
F I G. 5B

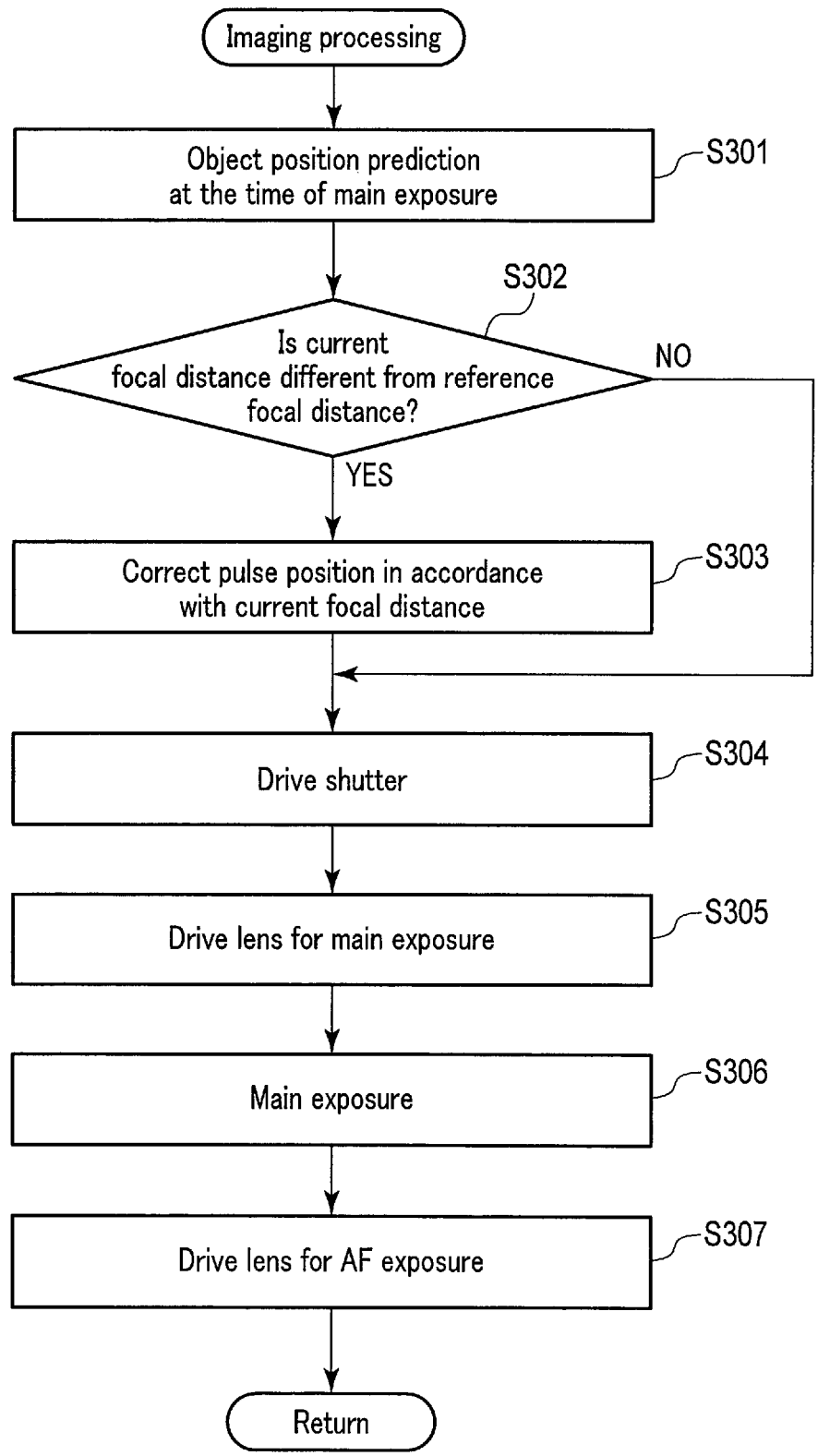
F I G. 8

FOCUS ADJUSTMENT APPARATUS, IMAGING APPARATUS, FOCUS ADJUSTMENT METHOD, AND RECORDING MEDIUM STORING A FOCUS ADJUSTMENT PROGRAM THEREON

CROSS-REFERENCE TO RELATED APPLICATIONS

This application is based upon and claims the benefit of priority from prior Japanese Patent Application No. 2016-247021, filed Dec. 20, 2016, the entire contents of which are incorporated herein by reference.

BACKGROUND OF THE INVENTION

1. Field of the Invention

The present invention relates to a focus adjustment apparatus, an imaging apparatus, a focus adjustment method, and a recording medium storing a focus adjustment program thereon.

2. Description of the Related Art

The performance of digital cameras is making day-to-day progress, and a variety of functions of digital cameras allows high-quality photographing, regardless of a photographer's skill. An autofocus (AF) function is one of those functions. To photograph a moving object accurately, an AF function of measuring a distance to an object, predicting an object position based on information of the distance measurement, and driving a lens based on the prediction is known. An imaging apparatus in which phase difference detection pixels are arranged on an imaging surface of an image element to detect a defocus value of a focus lens based on signals from the phase difference detection pixels is known. Even if the object is moving, it is possible to predict a distance to an object based on a change of the defocus value with respect to a lapse of time. Arranging the phase difference detection pixels on an imaging surface negates a need of installing a dedicated phase difference detection unit in a camera body, thereby reducing the size of the camera body.

For example, Jpn. Pat. Appln. KOKAI Publication No. 2016-80791 discloses a technique related to an imaging apparatus which adopts an imaging surface phase difference method for the purpose of providing a compact and light-weight imaging apparatus that is capable of photographing a moving object with high accuracy with a continuous AF mode using a technique of moving object prediction. In this imaging apparatus, to achieve auto focus using a plurality of AF areas, the AF areas are divided into subareas, and correlation calculation is performed based on focus detection signals respectively corresponding to the subareas to calculate reliability, and an AF area with high reliability is selected to prevent unevenness in distance measurement.

Size reduction in an imaging lens has been demanded as well as size reduction in a camera body. Since a focus position changes as a focal distance changes in a varifocal lens, using a varifocal lenses is effective in size reduction among other focal length changeable-type lenses. With a small-sized varifocal lens, overall portability of a camera system is improved, and a camera can be easily handled at the time of photographing.

BRIEF SUMMARY OF THE INVENTION

According to an aspect of the present invention, a focus adjustment apparatus performs a focus adjustment operation based on an output of an image sensor that includes pupil-split phase difference detection pixels for receiving an optical flux that passes a photographing lens, the photographing lens including a focus lens and a variable magnification lens. The focus adjustment apparatus includes a memory; and at least one circuit configured to: determine a defocus value based on an output of the image sensor to calculate a position where the focus lens attains focus as a target position; detect a focal distance of the photographing lens; store, in the memory, the target position, which is calculated based on an output from a detection operation by the image sensor, in association with the focal distance at the time of the detection operation; determine a reference focal distance and calculate a corrected target position by correcting the stored target position so as to correspond to the reference focal distance in accordance with a difference between the stored focal distance and the reference focal distance; calculate a predicted position by performing moving object prediction calculation based on the corrected target position; and move the focus lens based on the predicted position.

According to an aspect of the present invention, an imaging apparatus includes the above-mentioned focus adjustment apparatus, a photographing lens including the focus lens and the variable magnification lens; and the image sensor.

According to an aspect of the present invention, a method for performing focus adjustment is based on an output of an image sensor that includes pupil-split phase difference detection pixels for receiving an optical flux that passes a photographing lens, the photographing lens including a focus lens and a variable magnification lens. The focus adjustment method includes determining a defocus value based on an output of the image sensor to calculate a position where the focus lens attains focus as a target position; detecting a focal distance of the photographing lens; storing the target position, which is calculated based on an output from a detection operation by the image sensor, in association with the focal distance at the time of the detection operation; determining a reference focal distance and calculating a corrected target position by correcting the stored target position so as to correspond to the reference focal distance in accordance with a difference between the stored focal distance and the reference focal distance; calculating a predicted position by performing moving object prediction calculation based on the corrected target position; and moving the focus lens based on the predicted position.

According to an aspect of the present invention, a non-transitory computer readable recording medium stores a program for focus adjustment that is performed based an output of an image sensor that includes pupil-split phase difference detection pixels for receiving an optical flux that passes a photographing lens, the photographing lens including a focus lens and a variable magnification lens. The program includes a code for determining a defocus value based on an output of the image sensor to calculate a position where the focus lens attains focus as a target position; a code for detecting a focal distance of the photographing lens; a code for storing the target position that is calculated based on an output from a detection operation by the image sensor in association with the focal distance at the time of the detection operation; a code for determining a reference focal distance and calculating a corrected target position by correcting the stored target position so as to correspond to the reference focal distance in accordance with a difference between the stored focal distance and the reference focal distance; a code for calculating a predicted position by performing moving object prediction calculation based on the corrected target position; and a code for moving the focus lens based on the predicted position.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing a configuration example of a digital camera according one embodiment.

FIG. 3A is an explanatory drawing to explain the relationship between the change in a focal distance and a lens position of the focus lens, and to explain the case where the focal distance does not change.

FIG. 3B is an explanatory drawing to explain the relationship between the change in a focal distance and a lens position of the focus lens, and to explain the case where the focal distance changes.

FIG. 5A is a drawing explaining an AF area in a single-target mode.

FIG. 5B is a drawing explaining an AF area in a first group-target mode.

FIG. 8 is a flow chart showing an example of an outline of imaging processing.

DETAILED DESCRIPTION OF THE INVENTION

Figure 2:
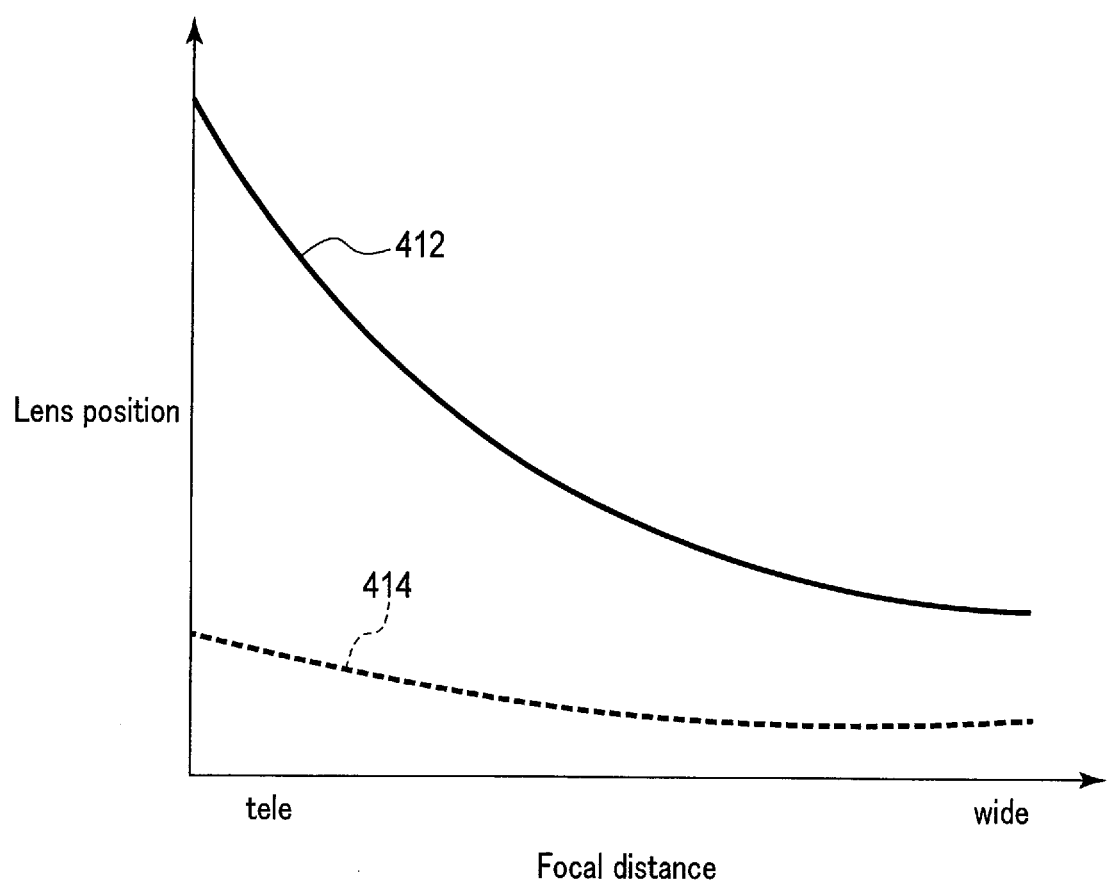
FIG. 2 is an explanatory drawing to explain the relationship between a focal distance and a lens position of a focal lens.

An embodiment of the present invention will be described with reference to the drawings. The present embodiment relates to auto focus (AF) of a digital camera as an imaging device using an image sensor. The present embodiment particularly relates to AF by a phase difference detection method in a case where a focal distance changes during consecutive photographing with a digital camera which adopts a varifocal lens. When a focal distance of the varifocal lens changes, the digital camera according to the present embodiment corrects an influence of the change to achieve AF with high accuracy.

[Configuration of Digital Camera]

FIG. 1 schematically shows a configuration example of a digital camera 1. The digital camera 1 is an interchangeable-lens digital camera. The digital camera 1 includes a camera body 100 and a photographing lens 200. The photographing lens 200 is detachable from the camera body 100. The digital camera 1 is not necessarily an interchangeable-lens digital camera. For example, the digital camera 1 may be a lens-integrated digital camera.

The photographing lens 200 is a varifocal lens. A varifocal lens can change its focal distance by moving a variable magnification lens. In a varifocal lens, a position of focus also changes as a focal distance changes; as a result, a position of a focus lens that attains focus also changes. On the other hand, a varifocal lens has an advantage in reducing the size of camera, compared to a zoom lens.

As shown in FIG. 1, the photographing lens 200 includes a lens system controller 210, a communication control unit 216, a focus lens 222, a focus lens drive unit 224, a variable magnification lens 226, a variable magnification lens drive unit 228, a diaphragm 232, and a diaphragm drive unit 234. The focus lens 222 and the variable magnification lens 226, etc. are optical systems for forming an image in the image sensor 126 of the later-described camera body 100 from a luminous flux of an object.

The lens system controller 210 controls an operation of each component of the photographing lens 200. The lens system controller 210 is configured to communicate with the camera body 100 through the communication control unit 216. The lens system controller 210 controls the operation of the focus lens 222, the variable magnification lens 226, and the diaphragm 232 under the control of the camera body 100. In the present embodiment, the position of the focus lens 222 is managed using a pulse number; however, a defocus value or a distance to an object may be used to manage the position. The lens system controller 210 transmits various types of information to the camera body 100 through the communication control unit 216. The communication control unit 216 controls communication with the camera body 100 under the control of the lens system controller 210.

The focus lens 222 is configured to move in an optical axis direction to adjust a position where the photographing lens 200 attains focus. The focus lens drive unit 224 changes a position of the focus lens 222 based on a control signal from the lens system controller 210. The focus lens drive unit 224 has a function as a position detection unit for detecting a position of the focus lens 222. The position of the focus lens 222 is controlled using information of a detected position.

The variable magnification lens 226 is configured to move in an optical axis direction to adjust a focal distance of the photographing lens 200. The variable magnification lens drive unit 228 changes a position of the variable magnification lens 226 based on a control signal from the lens system controller 210.

The diaphragm 232 is placed in the optical axis of the focus lens 222 and the variable magnification lens 226, etc., and is configured to change a size of its aperture. The diaphragm 232 regulates a luminous flux of an object that enters the image sensor 126 through the focus lens 222 and the variable magnification lens 226, etc. The diaphragm drive unit 234 changes an aperture of the diaphragm 232 based on a control signal from the lens system controller 210.

The camera body 100 includes a system controller 110, a memory 112, a lens control unit 116, a communication path 118, a mechanical shutter 122, a mechanical shutter drive unit 124, an image sensor 126, an image sensor drive unit 128, a correlated double sampling circuit (CDS) 132, an amplifier (AMP) 134, an A/D converter 136, an AE processor 142, an AF processor 144, an image processor 146, a compression/expansion unit 148, a liquid crystal display (LCD) 152, an electronic view finder (EVF) 154, a display control unit 156, a user interface (UI) 162, a UI control unit 164, a recording medium control unit 172, and a recording medium 174.

The system controller 110 is a control unit that performs overall control of the digital camera 1 in accordance with a program stored in the memory 112. The control includes a focus adjustment operation which is performed in compliance with a predetermined method of focus adjustment, and the system controller 110 cooperates with the AF processor 144 to function as a focus adjustment apparatus. The system controller 110 communicates with the photographing lens 200 via the lens control unit 116 to transmit various types of control signals to, and receive the same from, the photographing lens 200. The control signal includes a control signal for moving the focus lens 222 by the system controller 110 serving as a control unit to a target position for focusing that is calculated by distance-measuring calculation, which will be described later, or to a predicted position for focusing that is predicted based on a motion of the object.

The memory 112 as a storage unit includes a DRAM and an SDRAM etc., for example. This memory is an electrically-rewritable memory which temporarily stores various types of data, such as image data, image data for recording, image data for display, and processing data in the system controller 110 and the AF processor 144, etc. The memory 112 includes a ROM, etc. The memory stores various types of data, such as programs used in the system controller 110, and adjustment values, etc. of the camera body 100.

The lens control unit 116 controls communication with the photographing lens 200. The lens control unit 116 is connected to the communication control unit 216 of the photographing lens 200 via the communication path 118. Information is transmitted and received between the system controller 110 of the camera body 100 and the lens system controller 210 of the photographing lens 200 via the lens control unit 116, the communication path 118, and the communication control unit 216.

The mechanical shutter 122 opens and closes so as to adjust a time during which a luminous flux enters into the image sensor 126 from the object (an exposure time of the image sensor 126). For example, a focal plane shutter may be employed as the mechanical shutter 122. The mechanical shutter drive unit 124 drives the mechanical shutter 122 based on a control signal from the system controller 110.

The image sensor 126 has a photoelectric surface on which a number of photoreceptor elements are arranged in a matrix. The image sensor 126 has RGB color filters arranged in a grid pattern. For example, the pixels in the image sensor 126 are arranged in a Bayer array of R, Gr, Gb, and B. An image of the object that passes the optical system of the photographing lens 200 is formed on the photoelectric surface of the image sensor 126 and is photoelectrically converted.

The image sensor drive unit 128 controls the exposure time of an electrical charge in each pixel of the image sensor 126 by an electronic shutter drive signal. The image sensor 126 synchronizes with a vertical transfer clock signal and a horizontal transfer clock signal supplied from the image sensor drive unit 128, and outputs an electrical charge accumulated in each pixel as an image signal.

The CDS 132 performs noise reduction and gain adjustment on the image signal that is output from the image sensor 126. The AMP 134 amplifies the image signal that has been processed by the CDS 132. The A/D converter 136 converts the image signal amplified by the AMP 134 into digital image data.

In the image sensor 126, pupil-split phase difference detection pixels are arranged in, for example, some of the Gr pixels. For example, in the phase difference detection pixels, the left side of a photoreceptor is masked and the right side of another photoreceptor is masked so as to constitute a pair. Phase differences are detected based on output signals of the phase difference detection pixels that constitute pairs, and defocus values (blur amounts) are calculated.

The AE processor 142 performs calculation related to exposure control based on, for example, the image data obtained by the image sensor 126. In other words, the AE processor 142 determines values of shutter speed, F-number, and photographic sensitivity, etc. so as to obtain correct exposure.

The AF processor 144 performs defocus amount calculation for calculating a direction of defocus and an amount of defocus for a focused position of the focus lens 222. The AF processor 144 obtains pixel data from the phase difference detection pixels arranged in the image sensor 126, and calculates a direction of defocus and an amount of defocus for the focused position of the focus lens 222 based on the obtained pixel data, using a publicly-known calculation method, such as correlation calculation. The AF processor 144 then calculates a lens position to which the focus lens 222 should be driven based on the direction of defocus and an amount of defocus. At this time, the AF processor 144 obtains information of a focal distance corresponding to a position of the variable magnification lens 226 to take into consideration an influence from the change in the focal distance.

The image processor 146 performs various types of image processing of the image data. For example, when recording a still image, the image processor 146 performs image processing for still-image recording. Likewise, when recording a moving image, the image processor 146 performs image processing for moving-image recording. Furthermore, when displaying a live view, the image processor 146 performs image processing for display.

When recording the image data, the compression/expansion unit 148 compresses the image data generated by the image processor 146 (still image data or moving image data). When reproducing the image data, the compression/expansion unit 148 expands the image data that is compressed and stored in the recording medium 174.

The LCD 152 is a display apparatus, and is arranged at the back surface of the camera body 100, for example. The EVF 154 is a display apparatus, and is arranged at the upper surface of the camera body 100, for example. The display control unit 156 controls a display operation of the LCD 152 or the EVF 154 under control of the system controller 110. The LCD 152 or the EVF 154 displays live-view images, recorded images, status of the digital camera 1, and various types of setting displays, etc.

The UI 162 includes a switch, a button, a dial, a touch panel, etc. A user carries out various types of inputs for operating the digital camera 1 through the UI 162. The UI control unit 164 receives an input to the UI 162, and transmits the input information to the system controller 110.

As a result, the operation of the digital camera 1 is controlled in accordance with the input to the UI 162.

The recording medium control unit 172 controls reading and writing to the recording medium 174. The recording medium 174 is designed to be built or installed in the camera body 100, and the image data for recording is recorded as an image file in a predetermined format.

The system controller 110, the AE processor 142, the AF processor 144, the image processor 146, and the compression/expansion unit 148 may be realized by at least one integrated circuit, such as a central processing unit (CPU), an application specific integrated circuit (ASIC), or a field programmable gate array (FPGA), etc. Each of the system controller 110, the AE processor 142, the AF processor 144, the image processor 146, and the compression/expansion unit 148 may be realized by one or more integrated circuits. Two or more of the system controller 110, the AE processor 142, the AF processor 144, the image processor 146, or the compression/expansion unit 148 may be realized by a single integrated circuit.

[AF Operation of Digital Camera]

In the following, the operation in a continuous AF mode will be described. In a continuous AF mode, while a user is halfway pressing a release button included in the UI 162, an image which is shot through the photographing lens 200 is used for calculation performed in the AF processor 144. As a result, even if an object moves, the AF operation is repeatedly performed so that an object is continuously in focus.

In FIG. 2, the horizontal axis indicates a focal distance of the photographing lens 200, and the vertical axis indicates a lens position of the focus lens 222 when the lens attains focus. In FIG. 2, the solid line 412 indicates a lens position when focus is attained in the closest side in each focal distance, and the dashed line 414 indicates a lens position when focus is attained in the infinity side in each focal distance. In the photographing lens 200, which is a varifocal lens, a lens position where focus is attained changes in accordance with a focal distance as shown in FIG. 2. The lens position of the focus lens 222 is determined between the solid line 412 and the dashed line 414 in accordance with the distance of an object and a focal distance. Herein, if a focal distance is unknown, a lens position where focus is attained is not specified. Generally, higher resolution is required in the "tele" side than in the "wide" side, and a difference between a lens position where focus is attained becomes smaller between the closest side and the infinity side as the position changes from the "tele" side to the "wide" side.

An example of a result of the distance measuring calculation for a moving object is shown in FIGS. 3A and 3B. These drawings show an example in which the object is approaching toward the digital camera 1 at a predetermined speed. The top graph in each of FIGS. 3A and 3B indicates a position of the focus lens 222, which is calculated based on a detected defocus value, with respect to a lapse of time when focus is attained. The black dots in the drawings schematically indicate a lens position that is determined every time the processing is repeated. The bottom graph in each of FIGS. 3A and 3B indicates an amount of change in a focal distance of the photographing lens 200 with respect to a lapse of time. In other words, FIG. 3A shows a case where a focal distance does not change, and FIG. 3B shows a case where a focal distance does not change from time t0 to time t1 but changes after time t1 at a constant speed v.

In the example shown in FIG. 3A, a distance to the object smoothly changes as time elapses, while the focal distance of the variable magnification lens 226 does not change; thus, a position of the lens in focus also smoothly changes as indicated by the solid line 422. On the other hand, in the example shown by the solid line 424 in FIG. 3B, a distance to the object smoothly changes as time elapses and the focal distance gradually changes after time t1; accordingly, the lens position when focus is attained also gradually changes to a position different from the position in the example of FIG. 3A. In time t1 in FIG. 3B, the change rate of the lens position is discontinuous.

Figure 4A:
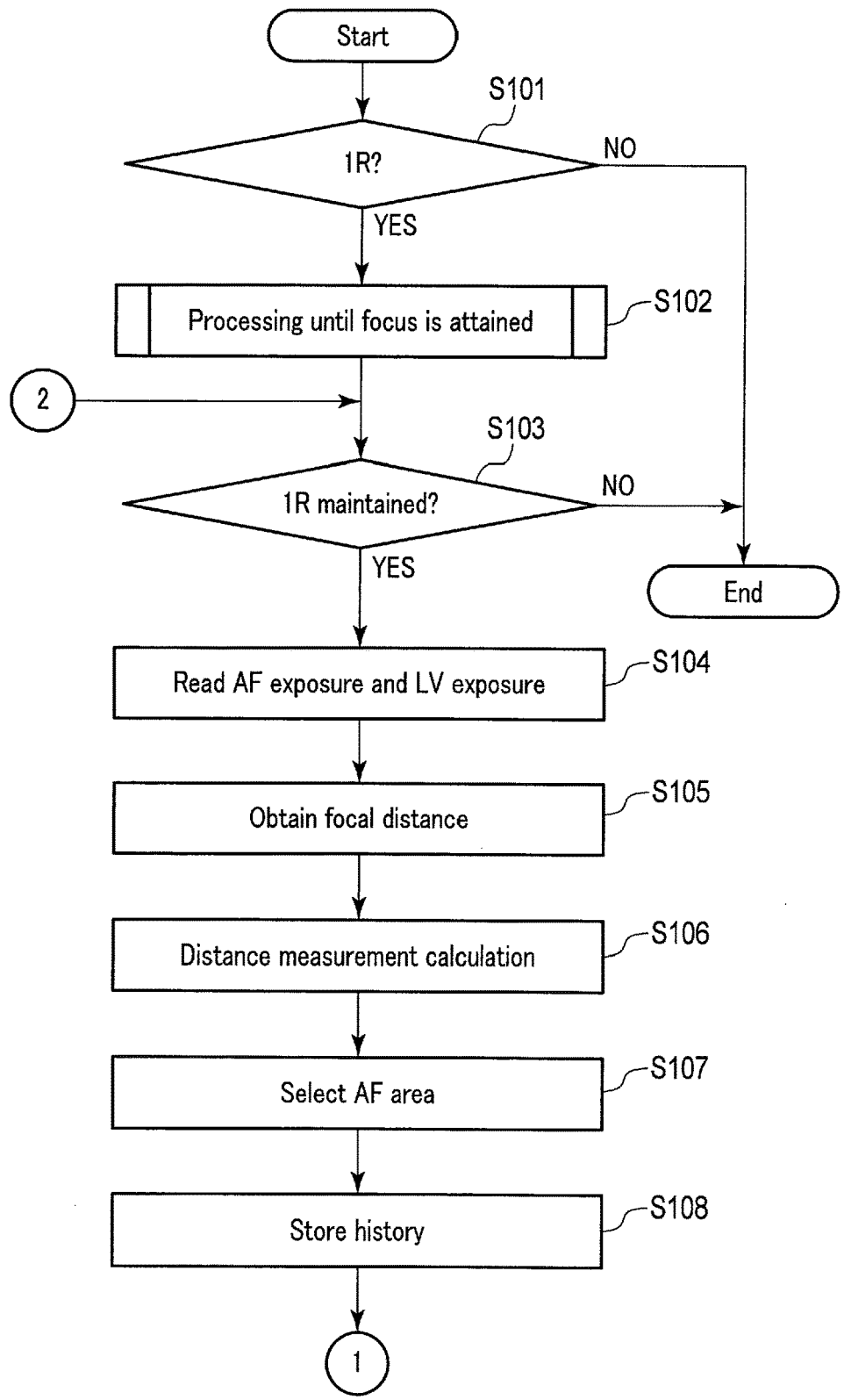
FIG. 4A is a flow chart showing an example of an outline of an AF operation in a continuous AF mode.
Figure 4B:
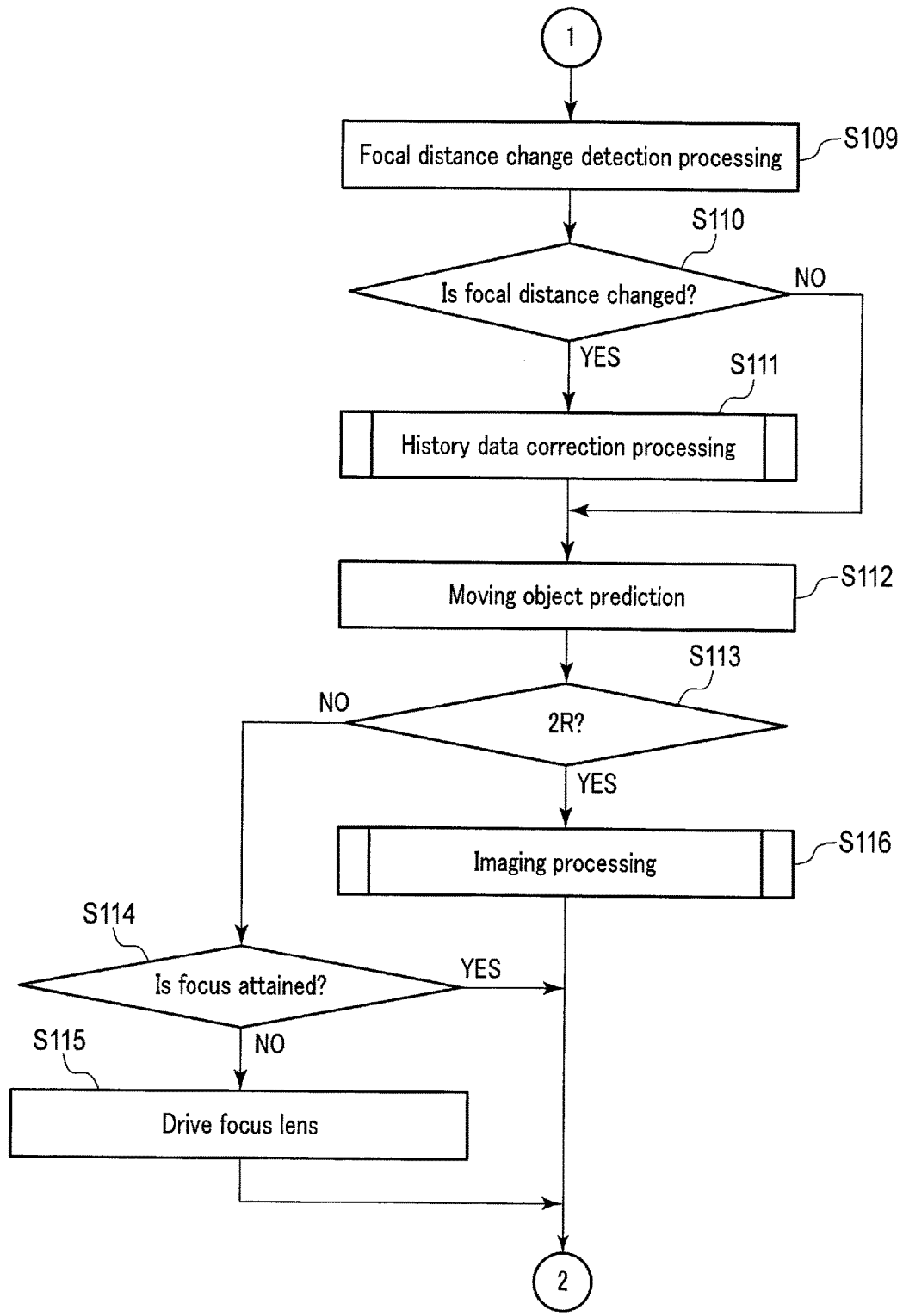
FIG. 4B is a flow chart showing an example of an outline of an AF operation in a continuous AF mode.

In the continuous AF mode according to the present embodiment, calculation is performed in consideration of a change in a focal distance. The operation related to the continuous AF according to the present embodiment is described with reference to the flow chart shown in FIGS. 4A and 4B. The processing is repeatedly performed when the continuous AF mode is selected as an AF mode.

In step S101, the system controller 110 determines whether or not the release switch included in the UI 162 is pressed in for one level, and determines whether the switch in the first stage is ON or not (1R: first release). If the switch is not set to 1R, the operation related to the present AF operation is not performed. If it is determined that the switch is set to 1R, the processing proceeds to step S102.

In step S102, the system controller 110 and the AF processor 144 perform processing until focus is attained. Specifically, the AF processor 144 detects an object by performing an object detection sequence, and calculates an in-focus position for the object. The system controller 110 moves the focus lens 222 to the vicinity of the in-focus position based on a result of the calculation by the AF processor 144.

In step S103, the system controller 110 determines whether 1R is maintained or not. When 1R is not maintained, the processing related to the present AF operation is finished. When 1R is maintained, the processing proceeds to step S104. Hereinafter, during a time when 1R is maintained, the processing from step S103 to step S116 is repeatedly performed as a 1R-maintained sequence. During the 1R-maintained sequence, AF exposure for detecting a phase difference using the phase difference detection pixels and LV exposure for generating a live-view (LV) image are repeated alternately, for example.

In step S104, the system controller 110 reads AF exposure and LV exposure. The image processor 146 performs image processing for live view display for an image data related to the read LV exposure. The image after performing the image processing thereon is displayed on the LCD 152 or the EVF 154. The AF processor 144 obtains image data related to the read AF exposure. In step S105, the system controller 110 obtains a position of the variable magnification lens 226, that is, a current focal distance of the photographing lens 200.

In step S106, the AF processor 144 performs distance measuring calculation to calculate a defocus value based on the data of the read AF exposure. In other words, the AF processor 144 applies illuminance correction processing on the obtained data, and performs correlation calculation using the corrected data. Subsequently, the AF processor 144 performs reliability determination processing to evaluate reliability of a result of the correlation calculation. In other words, the AF processor 144 carries out a determination of pixel saturation, a determination of lack of contrast, and a determination on a relationship between a minimal value of a result of the correlation calculation and values in the neighborhood thereof, and evaluates reliability of the calculation result. The AF processor 144 calculates a two-image value for an AF area which is determined to have reliability, and calculates a defocus value by multiplying the value with a constant. The AF processor 144 calculates a target position which is a position of the lens which attains focus, using the defocus value and a current lens position. The position of the focus lens 222 is managed by, for example, a pulse number, and a target position is calculated as a target pulse position.

Thus, the AF processor 144 has a function as a target position calculation unit that determines a defocus value based on an output from the image sensor 126 and calculates a target position where the focus lens 222 attains focus.

Figure 5C:
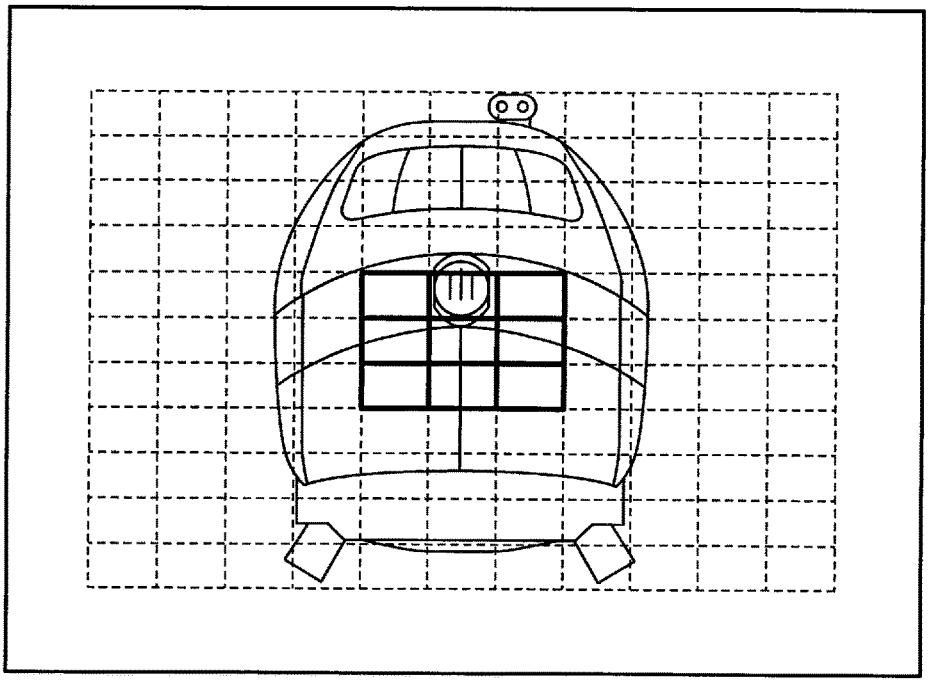
FIG. 5C is a drawing explaining an AF area in a second group-target mode.
Figure 5D:
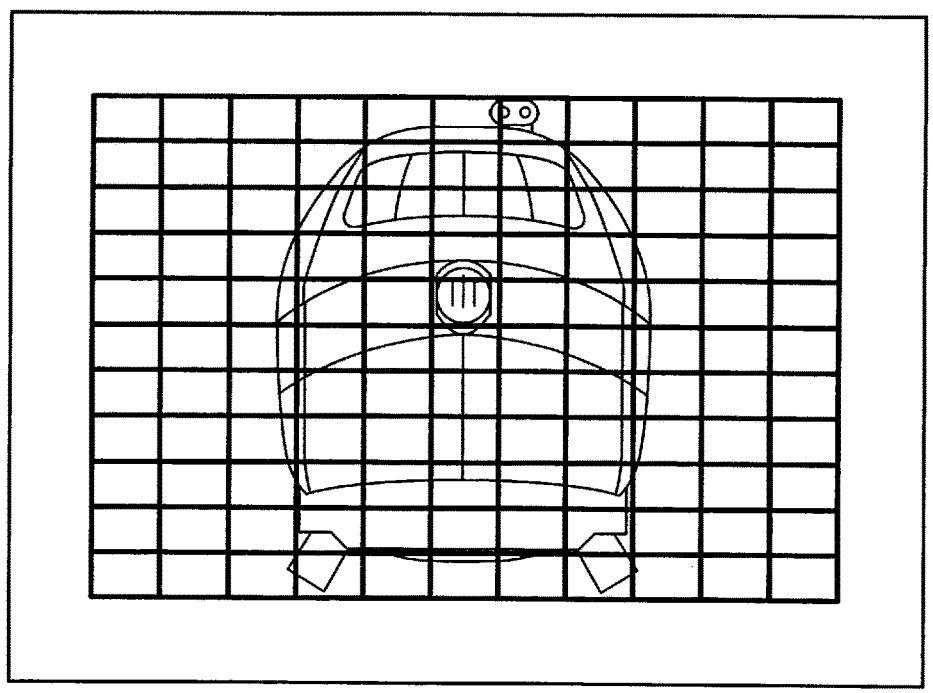
FIG. 5D is a drawing explaining an AF area in an all-target mode.

In step S107, the AF processor 144 selects an AF area. The AF area is herein explained. The AF processor 144 performs distance-measuring calculation for a necessary AF area in accordance with an AF target mode. Examples of an AF target mode are a single-target mode, a first group-target mode, a second group-target mode, and an all-target mode. FIGS. 5A to 5D are the schematic drawings to explain each of the AF target modes. In the single-target mode, one area is targeted for the distance measuring calculation, as shown in FIG. 5A. In the first group-target mode, one area and four areas adjacent to the area (left, right, top and bottom) are targeted for the distance measuring calculation, as shown in FIG. 5B. In the second group-target mode, 9 (3×3) areas are targeted for the distance measuring calculation, as shown in FIG. 5C. In the all-target mode, 25 (5×5) areas selected around the areas that are previously selected from 121 (11×11) AF areas are targeted for the distance measuring calculation, as shown in FIG. 5D.

In the present embodiment, among the single-target mode, the first group-target mode, the second group-target mode, and the all-target mode, for example, an optimal AF area is selected from multiple AF areas when the first group-target mode, the second group-target mode, or the all-target mode is set, except for the single target mode in which there is only one AF area.

In the continuous AF, an object should always be captured while 1R is being maintained. For this reason, the position of the focus lens 222 needs to be maintained in the vicinity of an in-focus position. In the present embodiment, an AF area is selected using a result of moving object prediction calculation based on history data, which will be described later in detail. This moving object prediction calculation is performed in step S112.

Figure 6:
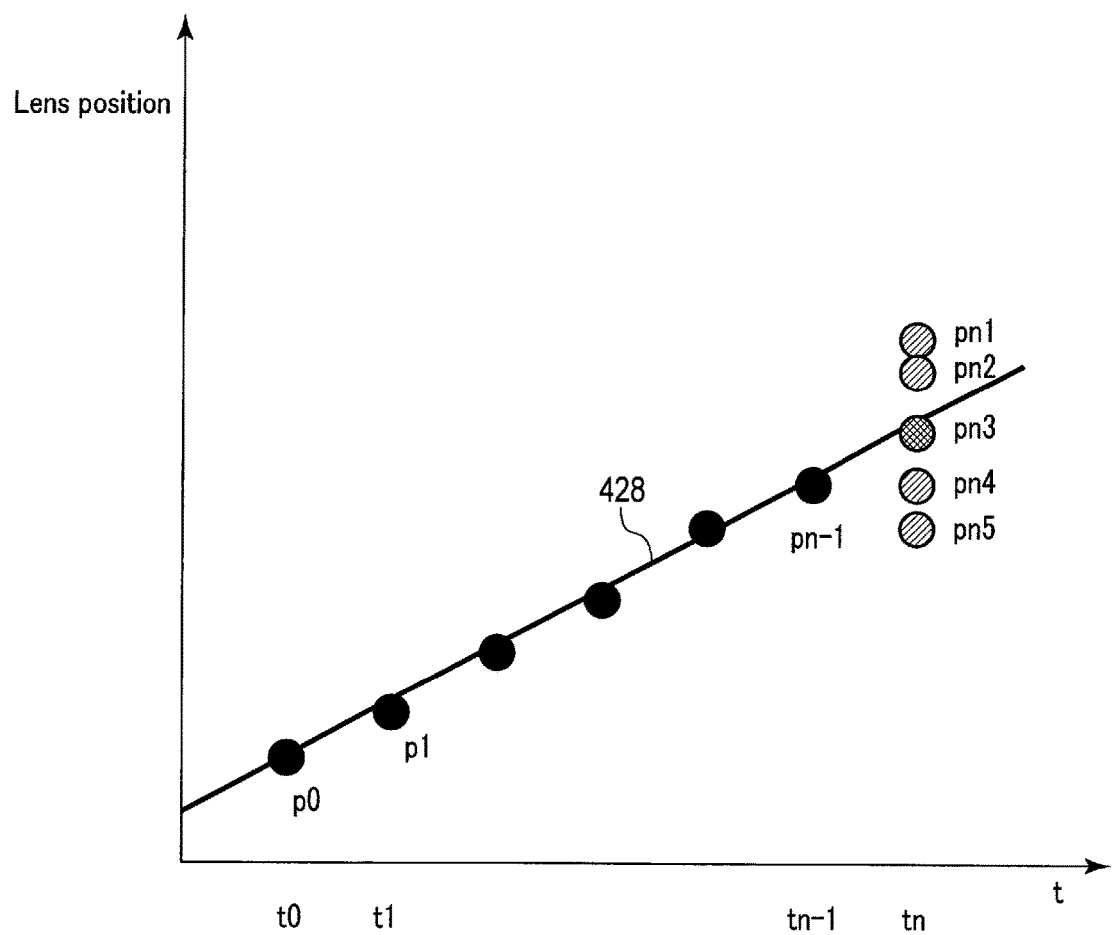
FIG. 6 is a drawing showing an example of the relationship between a lens position of the focus lens and a lapse of time.

FIG. 6 shows a lens position of the focus lens 222 with respect to a lapse of time. Suppose if the current time is tn, and the lens positions determined as a result of the distance-measuring calculation for five AF areas are pn1, pn2, pn3, pn4, and pn5. In this case, the AF processor 144 calculates a prediction expression (prediction model) indicated by the solid line 428 based on the lens positions p0, p1, . . . , pn-1 at past times t0, t1, . . . , tn-1. As an AF area, the AF processor 144 selects an AF area that indicates a value closest to the prediction expression (prediction model), for example, an AF area corresponding to pn3 in the case shown in FIG. 6. Thus, even if an object is moving, or any other cases, an optimum AF area can be selected.

The explanation will continue, returning to FIG. 4A. In step S108, the AF processor 144 associates a target position (target pulse position) of the focus lens 222 located in an in-focus position of the selected AF area with a focal distance for the position of the variable magnification lens 226 at this time, and stores the target position and the focal distance as history data.

In step S109, the AF processor 144 performs focal distance change detection processing. In the focal distance change detection processing, the AF processor 144 detects a change in the focal distance based on the information of focal distance in the history data.

In step S110, the AF processor 144 determines whether the focal distance in the history data changes or not. If the focal distance does not change, the processing proceeds to step S112. If the focal distance changes, the processing proceeds to step S111.

Figure 7:
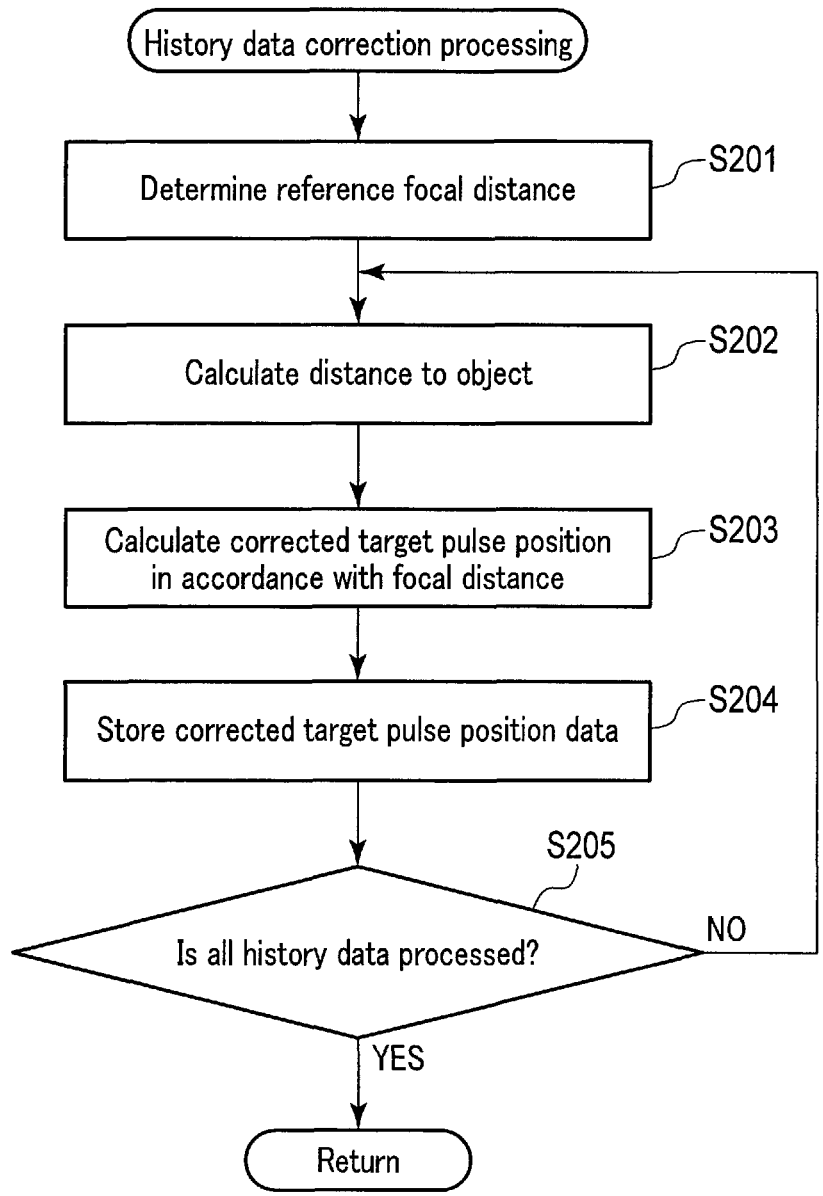
FIG. 7 is a flow chart showing an example of an outline of history data correction processing.

In step S111, the AF processor 144 performs history data correction processing. After the history data correction processing, the processing proceeds to step S112. The history data correction processing will now be explained with reference to the flow chart shown in FIG. 7.

In step S201, the AF processor 144 determines a reference focal distance. A reference focal distance can be set at any value, and is selected from, for example, the data included in the history data. For example, among the data included in the history data, a most common focal distance is selected as a reference focal distance. Or, among the focal distances included in the history data, a focal distance on the most tele-side (the longest focal distance) is selected as a reference focal distance. As shown in FIG. 2, since more detailed position control for the focus lens 222 is possible on the tele-side, selecting a focal distance on the tele-side as a reference focal distance is a preferable aspect.

The following values for each photographing lens 200 in accordance with the characteristics of the variable magnification lens 226 are known, and these values are stored in advance in, for example, the AF processor 144, the memory 112, or the photographing lens 200. A closest photographing distance Dn is thus known for each focal distance. An optical infinity pulse position dis_m1, and an optically-closest pulse position dis_m2 are also known for each focal distance. An object distance Do, which is a distance to an object, is represented by the following expression based on a focal distance included in the history data and a pulse position Po where the focus lens 222 attains focus, which is calculated by distance measurement calculation:

$$1/Do = 1/Dn - (Po - \text{dis\_m1})\,(1/Dn)/(\text{dis\_m2} - \text{dis\_m1}) \quad (1)$$

In step S202, the AF processor 144 calculates an object distance Do for each data based on the target position (target pulse position) where the focus lens 222 attains focus included in the history data.

In step S203, the AF processor 144 calculates, based on the calculated object distance Do, the target position (target pulse position) where the focus lens 222 attains focus, which is converted into the reference focal distance determined in step S201, for each data included in the history data. The converted pulse position that is calculated herein is referred to as a corrected target pulse position Pc. The corrected target pulse position Pc is represented by the following expression:

$$Pc = Pstd(1/Dn - 1/Do)/(1/Dn) + Pinf \quad (2)$$

Herein, Pinf represents an optical infinity pulse position related to a reference focal distance. When an optically-closest pulse position related to a reference focal distance is represented by Pclo, Pstd is an optically-closest pulse position Pclo with respect to an optical infinity pulse position Pinf for a reference focal distance as a reference, and is expressed as Pstd=Pclo−Pinf.

In step S204, the AF processor 144 stores the calculated corrected target pulse position Pc. Thus, when calculating a corrected target pulse position Pc, a target pulse position is first converted into object distance information, and a corrected target pulse position Pc is calculated based on the distance information.

In step S205, the AF processor 144 determines whether or not the corrected target pulse position Pc is calculated and stored for all history data. If the corrected target pulse position Pc is not calculated for all history data, the processing from step S202 to step S204 is repeated and, the corrected target pulse position Pc is calculated and stored for all history data. When the corrected target pulse position Pc for all history data is calculated and stored, the history data correction processing is finished, and the processing returns to step S111. By the history data correction processing, the corrected target pulse position Pc in the reference focal distance is calculated for all history data. This corrected target pulse position Pc is used as a corrected target position of the focus lens 222 when the focus lens 222 is moved.

The calculation of the corrected target pulse position Pc may not be necessarily performed for all history data every time the processing is performed; it may be performed only when the focal distance in the history data changes during the focal distance change detection processing. The change of the reference focal distance may be performed every predetermined number of times of the history data correction processing.

Thus, the AF processor 144 has a function as a focal distance detection unit that detects a focal distance of the photographing lens 200, and a function as a corrected target position calculation unit that determines a reference focal distance and calculates a corrected target position by correcting a stored target position so as to correspond to the reference focal distance in accordance with a difference between a stored focal distance and a reference focal distance.

The explanation will continue, returning to FIG. 4B. In step S112, the AF processor 144 performs moving object prediction calculation. The moving object prediction calculation is performed based on history data, as described in the above with reference to FIG. 6. Specifically, a prediction model using a least squares method, etc. is generated based on a past target pulse position or a past corrected target pulse position that is stored as history data. A future position of the object can be predicted based on this prediction model. This prediction model is used to select an AF area in step S107, which is performed next time, as described above. This prediction model is also used to predict an object position when the main exposure is performed in step S301, which will be described later.

In step S113, the system controller 110 determines whether or not the release switch included in the UI 162 is pressed in for two levels, and determines whether the switch in the second stage is ON or not (2R: second release). If the switch is not set in 2R, the processing proceeds to step S114.

In step S114, the AF processor 144 determines whether focus is attained or not based on a result of the distance measuring calculation for the AF area selected in step S107, which is a result of the distance measuring calculation performed in step S106. For example, if a calculated defocus value is smaller than a predetermined value, it is determined that focus is attained. If focus is attained, the processing proceeds to step S103. In other words, the above-described processing is repeated without changing the lens position of the focus lens 222.

If focus is not attained, the processing proceeds to step S115. In step S115, the system controller 110 moves the focus lens 222 to the in-focus position that is calculated by the distance measuring calculation. Subsequently, the processing returns to step S103. In other words, the lens position of the focus lens 222 is changed, and the above-described processing is repeated.

Thus, if 2R is not set but 1R is maintained, AF exposure and LV exposure are repeatedly performed, and distance measuring calculation is performed for every AF exposure, and an amount of defocus is calculated based on a result of the distance measuring calculation, and the focus lens 222 is driven in accordance with the calculated amount of defocus.

In step S113, if it is determined that 2R is set, the processing proceeds to step S116. In step S116, the system controller 110, etc. performs imaging processing related to still image photographing. The imaging processing is explained with reference to the flow chart shown in FIG. 8.

Figure 9:
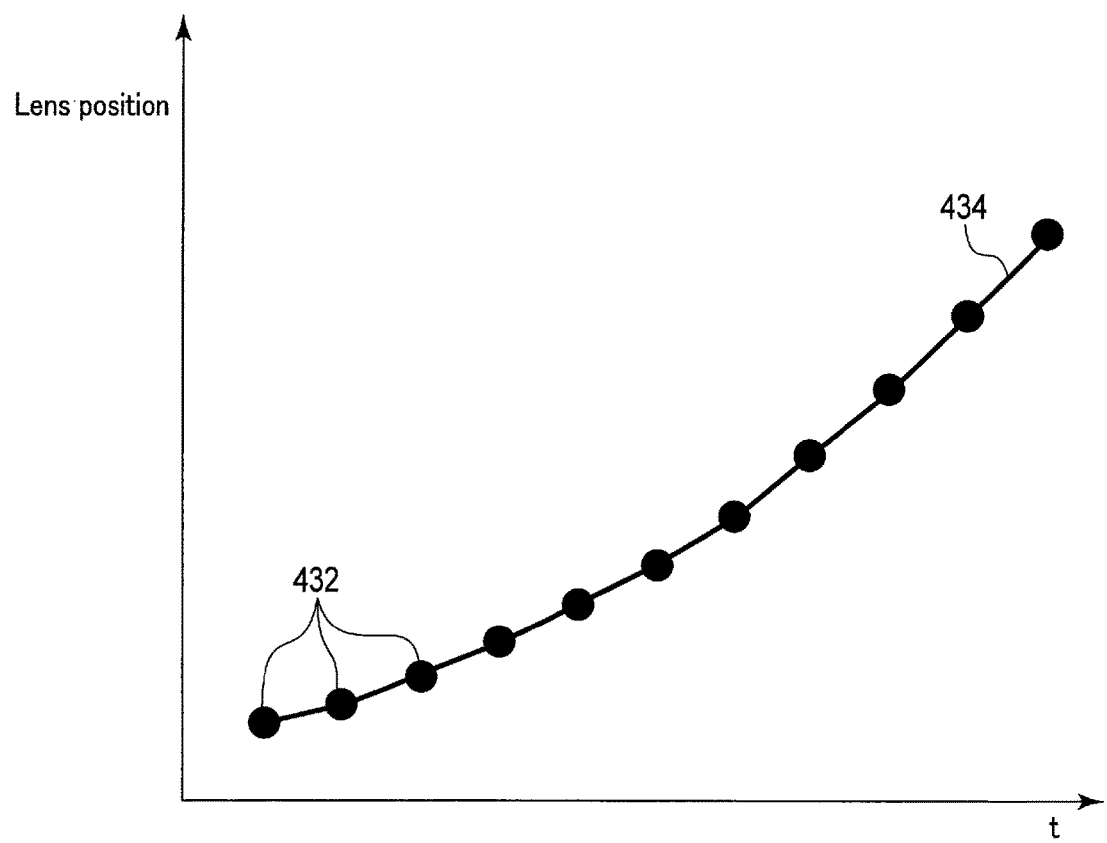
FIG. 9 is a diagram explaining prediction of a position of an object.

In step S301, the AF processor 144 predicts an object position at the time of main exposure, using history data related to the distance measuring calculation that is obtained during a time when 1R is maintained. FIG. 9 is a diagram explaining prediction of an object position. In FIG. 9, the horizontal axis indicates elapsed time, and the vertical axis indicates the lens position of the focus lens 222 by a pulse number. In FIG. 9, when a corrected target pulse position is calculated, each dot 432 represents a corrected target pulse position that is obtained by correcting a target pulse position in accordance with a reference focal distance, which is a result of distance measuring calculation that is obtained each time. If a focal distance does not change and no corrected target pulse position is calculated, each dot 432 represents a target pulse position. The AF processor 144 performs calculation for predicting an object position at the time of main exposure based on the prediction model obtained in step S112 to calculate a predicted pulse position.

Thus, the AF processor 144 has a function as a predicted position calculation unit that calculates a predicted position by performing moving object prediction calculation based on a corrected target position.

In step S302, the AF processor 144 determines whether the focal distance of the current variable magnification lens 226 is different from a reference focal distance or not. If the current focal distance is not different from a reference focal distance, the processing proceeds to step S304. If the current focal distance is different from a reference focal distance, the processing proceeds to step S303.

In step S303, the AF processor 144 performs correction to convert the predicted pulse position that is calculated in step S301 to a pulse position corresponding to the current focal distance, using the above-described expression (2). Subsequently, the processing proceeds to step S304.

In step S304, the system controller 110 drives the mechanical shutter 122. In step S305, the system controller 110 moves the position of the focus lens 222 for main exposure to the predicted pulse position calculated in step S301, or to the predicted pulse position corrected in step S303. Diaphragm driving is performed for main exposure.

In step S306, the system controller 110 obtains a still image by causing the image sensor 126 to perform main exposure.

In step S307, the system controller 110 performs lens driving by, for example, opening the diaphragm, etc., to prepare for later AF exposure. Subsequently, the processing returns to the main flow. Specifically, the processing returns to step S103, and if 1R is maintained, AF exposure and LV exposure are repeatedly performed, distance measuring calculation is performed for every time of AF exposure, an object position is calculated in accordance with a result of the distance measuring calculation, and lens driving is performed in accordance with the calculated object position. If 2R is maintained, the imaging operation is repeated.

According to the digital camera 1 of the present embodiment, even when a focal distance is changed as a result of using a varifocal lens while continuous AF is being performed, the position of a focus lens is corrected. As a result, regardless of the change in the focal distance, the AF operation is performed appropriately, and an image with correct focus can be obtained. Furthermore, since AF can be appropriately performed even with a varifocal lens that is usually compact and light-weight, an overall reduction in size and weight for a digital camera can be achieved.

[Others]

Of the techniques described in the above embodiment, the controls described using the flow charts are realized as programs. The programs can be stored in a recording unit, such as the memory 112, or a recording medium. The programs can be recorded in the recording medium or recording unit in various ways. They may be recorded at the time of shipping a product, they can be recorded using a distributed recording medium, or they can be downloaded from the Internet.

The processing illustrated in the above-explained flow charts is merely an example, and the addition, deletion, or change in sequence of steps may be made as needed.

In the above-described embodiment, an example of an image surface phase difference method in which phase difference detection pixels that function as a phase difference detection element are arranged in the image sensor 126. However, the above-described techniques are not limited thereto, and may be adopted in an apparatus using a phase difference detection element which is provided separately from the image sensor 126.

The techniques according to the above-described embodiment are applicable not only to a digital camera. For example, the techniques may be applicable to a mobile information terminal equipped with an imaging apparatus, such as a smart phone and a tablet device. The mobile information terminals include wearable terminals. Furthermore, the techniques are not limited to cameras for consumers; they are applicable to a monitoring camera, a camera for a microscope, an industrial apparatus for inspection, and an observation apparatus used for medical purposes. The operation of the above-described devices by users may be performed through a network, such as the Internet. The techniques may be applicable to Internet of things (IoT) devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus adjustment apparatus that performs a focus adjustment operation based on an output of an image sensor that includes pupil-split phase difference detection pixels for receiving an optical flux that passes a photographing lens, the photographing lens including a focus lens and a variable magnification lens, the focus adjustment apparatus comprising:
   a memory; and
   at least one circuit configured to:
      determine a defocus value based on an output of the image sensor to calculate a position where the focus lens attains focus as a target position;
      detect a focal distance of the photographing lens;
      store, in the memory, the target position, which is calculated based on an output from a detection operation by the image sensor, in association with the focal distance at the time of the detection operation;
      determine a reference focal distance and calculate a corrected target position by correcting the stored target position so as to correspond to the reference focal distance in accordance with a difference between the stored focal distance and the reference focal distance;
      calculate a predicted position by performing moving object prediction calculation based on the corrected target position; and
      move the focus lens based on the predicted position.

2. The focus adjustment apparatus according to claim 1, wherein
   the circuit determines the reference focal distance based on the focal distance stored in the memory when the corrected target position is calculated.

3. The focus adjustment apparatus according to claim 1, wherein
   when the focus lens is moved, if the detected focal distance is different from the reference focal distance, the circuit calculates a position of the focus lens corresponding to the detected focal distance based on the predicted position, and moves the focus lens based on the calculated position of the focus lens.

4. The focus adjustment apparatus according to claim 1, wherein
   when the corrected target position is calculated, the circuit converts the target position that is stored in the memory into distance information of a distance to an object, and calculates the corrected target position based on the distance information.

5. The focus adjustment apparatus according to claim 1, wherein
   when the corrected target position is calculated, the circuit defines a longest focal distance as the reference focal distance among the focal distances stored in the memory.

6. An imaging apparatus comprising:
   the focus adjustment apparatus according to claim 1;
   a photographing lens including the focus lens and the variable magnification lens; and
   the image sensor.

7. A method for performing focus adjustment based on an output of an image sensor that includes pupil-split phase difference detection pixels for receiving an optical flux that passes a photographing lens, the photographing lens including a focus lens and a variable magnification lens, the focus adjustment method comprising:
   determining a defocus value based on an output of the image sensor to calculate a position where the focus lens attains focus as a target position;
   detecting a focal distance of the photographing lens;
   storing the target position, which is calculated based on an output from a detection operation by the image sensor, in association with the focal distance at the time of the detection operation;
   determining a reference focal distance and calculating a corrected target position by correcting the stored target position so as to correspond to the reference focal distance in accordance with a difference between the stored focal distance and the reference focal distance;
   calculating a predicted position by performing moving object prediction calculation based on the corrected target position; and
   moving the focus lens based on the predicted position.

8. The focus adjustment method according to claim 7, wherein
calculating the corrected target position includes determining the reference focal distance based on the stored focal distance.

9. The focus adjustment method according to claim 7, wherein
moving the focus lens includes, if the detected focal distance is different from the reference focal distance, calculating a position of the focus lens corresponding to the detected focal distance based on the predicted position, and moving the focus lens based on the calculated position of the focus lens.

10. The focus adjustment method according to claim 7, wherein
calculating the corrected target position includes converting the target position that is stored into distance information of a distance to an object, and calculating the corrected target position based on the distance information.

11. The focus adjustment method according to claim 7, wherein
calculating the corrected target position includes defining the focal distance on a longest focus distance as the reference focal distance among the stored focal distances.

12. A non-transitory computer readable recording medium, the recording medium storing a program for focus adjustment that is performed based an output of an image sensor that includes pupil-split phase difference detection pixels for receiving an optical flux that passes a photographing lens, the photographing lens including a focus lens and a variable magnification lens,
the program includes:
a code for determining a defocus value based on an output of the image sensor to calculate a position where the focus lens attains focus as a target position;
a code for detecting a focal distance of the photographing lens;
a code for storing the target position, which is calculated based on an output from a detection operation by the image sensor, in association with the focal distance at the time of the detection operation;
a code for determining a reference focal distance and calculating a corrected target position by correcting the stored target position so as to correspond to the reference focal distance in accordance with a difference between the stored focal distance and the reference focal distance;
a code for calculating a predicted position by performing moving object prediction calculation based on the corrected target position; and
a code for moving the focus lens based on the predicted position.

13. The recording medium according to claim 12, wherein
the code for calculating the corrected target position includes a code for determining the reference focal distance based on the stored focal distance.

14. The recording medium according to claim 12, wherein
the code for moving the focus lens includes, if the detected focal distance is different from the reference focal distance, a code for calculating a position of the focus lens corresponding to the detected focal distance based on the predicted position, and moving the focus lens based on the calculated position of the focus lens.

15. The recording medium according to claim 12, wherein
the code for calculating the corrected target position includes a code for converting the target position that is stored into distance information of a distance to an object, and a code for calculating the corrected target position based on the distance information.

16. The recording medium according to claim 12, wherein
the code for calculating the corrected target position includes a code for defining the focal distance on a longest focus distance as the reference focal distance among the stored focal distances.

* * * * *